United States Patent
Ducloux et al.

(10) Patent No.: US 10,356,448 B2
(45) Date of Patent: Jul. 16, 2019

(54) MULTI REPRESENTATION EDGE SERVER WITH ENHANCED OPEN-GOP COMPRESSION

(71) Applicant: Harmonic, Inc., San Jose, CA (US)

(72) Inventors: Xavier Ducloux, Rennes (FR); Patrick Gendron, Chateaugiron (FR); Claude Perron, Betton (FR)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 15/298,182

(22) Filed: Oct. 19, 2016

(65) Prior Publication Data
US 2017/0111670 A1  Apr. 20, 2017

(51) Int. Cl.
*H04N 21/2343* (2011.01)
*H04N 21/231* (2011.01)
(Continued)

(52) U.S. Cl.
CPC ..... *H04N 21/234309* (2013.01); *H04N 19/40* (2014.11); *H04N 19/61* (2014.11);
(Continued)

(58) Field of Classification Search
CPC ............ H04N 19/40; H04N 19/61; H04N 21/234309; H04N 21/231; H04N 21/232; H04N 21/234345; H04N 21/23439; H04N 21/2353; H04N 21/236; H04N 21/6373; H04N 21/64622; H04N 21/8455; H04N 21/8456; H04N 21/64322
See application file for complete search history.

(56) References Cited

U.S. PATENT DOCUMENTS

| | | | | |
|---|---|---|---|---|
| 7,031,348 B1 * | 4/2006 | Gazit | ............... | H04N 21/23406 348/423.1 |
| 8,355,450 B1 * | 1/2013 | Eshet | ............... | H04N 21/44004 375/240.01 |

(Continued)

OTHER PUBLICATIONS

European Patent Office, European Search Report dated Dec. 18, 2015 for European Patent Application No. 15306681.6, dated Dec. 18, 2015, 9 pages.

(Continued)

*Primary Examiner* — Randy A Flynn
(74) *Attorney, Agent, or Firm* — Brokaw Patent Law PC; Christopher J. Brokaw

(57) ABSTRACT

A video server comprising an input port configured to receive from a user terminal requests to deliver video segments in a target representation. The server comprises an output port configured to deliver the requested video segments to the user terminal. The server comprises a data link configured to retrieve from storage capabilities, for each request from the user terminal, a video segment in at least one source representation in an Open GOP scheme. The server comprises an access to one or more video transcoding capabilities. The video server is configured to cause one or more video transcoding capabilities to transcode at least a part of the video segment in at least one source representation in an Open GOP scheme into the requested target representation in a Closed GOP scheme when the requested target representation is different from a representation previously provided to the user terminal.

21 Claims, 11 Drawing Sheets

(51) Int. Cl.
  *H04N 21/232* (2011.01)
  *H04N 21/235* (2011.01)
  *H04N 21/236* (2011.01)
  *H04N 21/6373* (2011.01)
  *H04N 21/643* (2011.01)
  *H04N 21/845* (2011.01)
  *H04N 19/40* (2014.01)
  *H04N 19/61* (2014.01)

(52) U.S. Cl.
  CPC ......... *H04N 21/231* (2013.01); *H04N 21/232* (2013.01); *H04N 21/236* (2013.01); *H04N 21/2353* (2013.01); *H04N 21/23439* (2013.01); *H04N 21/234345* (2013.01); *H04N 21/6373* (2013.01); *H04N 21/64322* (2013.01); *H04N 21/8455* (2013.01); *H04N 21/8456* (2013.01)

(56) References Cited

U.S. PATENT DOCUMENTS

| | | | |
|---|---|---|---|
| 2006/0233245 A1 | 10/2006 | Chou et al. | |
| 2007/0234385 A1* | 10/2007 | Bopardikar | H04N 21/43615 725/38 |
| 2009/0310668 A1* | 12/2009 | Sackstein | H04N 21/234354 375/240.01 |
| 2012/0170642 A1* | 7/2012 | Braness | H04N 21/6587 375/240.01 |
| 2013/0114744 A1* | 5/2013 | Mutton | H04N 21/8456 375/240.26 |
| 2014/0040496 A1* | 2/2014 | Moorthy | H04N 21/26258 709/231 |
| 2014/0040498 A1* | 2/2014 | Oyman | H04N 21/23439 709/231 |
| 2014/0095668 A1* | 4/2014 | Oyman | H04W 52/0258 709/219 |
| 2014/0281009 A1* | 9/2014 | Moorthy | H04N 21/44029 709/231 |
| 2014/0282777 A1* | 9/2014 | Gonder | H04N 21/64761 725/109 |
| 2015/0281746 A1 | 10/2015 | Lam | |
| 2015/0373385 A1* | 12/2015 | Straub | H04N 21/23412 725/34 |

OTHER PUBLICATIONS

Giladi et al., "Descriptions of Core Experiments on DASH amendment", 111. MPEG Meeting Feb. 6, 2015, Feb. 20, 2015, (Motion Picture Expert Group OR ISO/IEC JTC1/SC29/WG11), No. N15215, Feb. 24, 2015, XP030021941, Geneva, Switzerland, 40 pages.

* cited by examiner

MULTI REPRESENTATION EDGE SERVER WITH ENHANCED OPEN-GOP COMPRESSION

CLAIM OF PRIORITY

This application claims priority to European Patent Application No. 15306681.6, entitled "Multi Representation Edge Server with Enhanced Open-GOP Compression," filed on Oct. 20, 2015, the disclosure of which is hereby incorporated by reference for all purposes as if fully set forth herein.

FIELD OF THE INVENTION

Embodiments of the invention generally relate to the distribution of digital video, and more particularly, relate to encoding and transcoding of video content for delivery notably in OTT (Over-The-Top) mode.

BACKGROUND

The consumption of video content distributed over traditional IP networks has been increasing for some time, due in part to the availability of VOD (Video On Demand) services and the multiplication of devices on which such video content may be viewed. For example, video content may be accessed from various types of devices (such as smart phones, tablets, PC, TV, Set Top Boxes, and game consoles for example) that are connected through various types of networks (for example, broadcast, satellite, cellular, ADSL, and fiber).

Video content can be expressed or represented in many different ways. For example, the digital representation of video content is dependent on many factors, one of which is resolution. The resolutions available today include for example 480p (720×480 pixels), 576p (720×576 pixels), 720p (1280×720 pixels), 1080i (1920×1080 pixels split in two interlaced fields of 540 lines), 1080p (1920×1080 pixels), 2160p (3840×2160 pixels) and 4320p (7680×4320 pixels). The resolutions 720p, 1080i and 1080p are generally referred as "HD" (High Definition) or "HDTV" (High Definition Television), the resolution 1080p being more specifically referred to as "Full HD" (Full High Definition). Resolutions 2160p and 4320p are generally called "UHD" (Ultra High definition) or "UHDTV" (Ultra High Definition Television), 2160p being more specifically called "4K UHD" (4 kilo Ultra High Definition) and 4320p being more specifically called "8 k UHD" (8 kilo Ultra High Definition).

Due to the large size of raw digital video, digital video content is generally accessed while represented in a compressed form. The digital representation of video content is therefore also associated with a video compression standard. The most widely used video standards belong to the "MPEG" (Motion Picture Experts Group) family, which notably comprises the MPEG-2, AVC (Advanced Video Compression also called H.264) and HEVC (High Efficiency Video Compression, also called H.265) standards. Generally speaking, a more recent format offers more encoding features and/or provides a better compression ratio. For this reason, more recent formats are considered more advanced, e.g., the HEVC format is more recent and more advanced than AVC, which is itself more recent and more advanced than MPEG-2. Therefore, HEVC yields more encoding features and greater compression efficiency than AVC. The same is true with respect to AVC in relation to MPEG-2. Compression standards of the MPEG family are block-based compression standards; other block-based compression standards exist, such as the VP8, VP9 and VP10 Google formats.

Even within the same video compression standard, video content can be encoded differently. The same digital content may be encoded at different bitrates. As another example, the same digital content may also be encoded using only I-Frames (I-Frame standing for Intra-Frame), I and P-Frames (P standing for Predicted Frame) or I, P and B frames (B standing for Bi-directional frames). More generally, the number of available encoding options increases with the complexity of the video format.

The diversity of devices which may be used to access and play video content yields a multitude of optimal video formats for which support is desirable, as each type of device may have a preferred video format driven by its screen size. Each type of device may also have its own resolution and its own decoding features. For example, a set-top box is now able to decode UHD resolutions. Meanwhile, an average smart phone such as Nokia™ Lumia 520 has a resolution of 480×800 pixels, while an up-market smart phone such as the iPhone™ 6 has a 1080p resolution. The vast diversity of video display devices therefore results in a large diversity of video display resolutions.

The diversity of video decoding devices also leads to a diversity of decodable video formats. Recent and advanced decoding devices are already able to decode HEVC video, a standard smart phone may be able to decode AVC video only, and a large number of set-top boxes are still only able to decode MPEG-2 video.

Depending on the available communication link, a video decoding device will receive video content at different bitrates. For example, a set-top box or a PC using Wi-FI or a wired connection may receive digital video of a high quality and, therefore, a high bitrate. In contrast, a mobile device using a 3G connection may only be able to receive video of a low quality at a low bitrate.

The high diversity of video decoding devices, video compression standards, resolutions, and available bitrates therefore leads to a large combination of possible video types and formats in which digital video may need to be represented to serve a wide range of customers across heterogeneous networks.

The purpose of OTT (Over-The-Top) video is to deliver video content for any user of an IP network. In OTT delivery, a video is available in a number of different representations. A representation is a digital expression of video content according to certain characteristics such as, for example, video resolution, bitrate, compression format, encoding options, and packaging. A client receives information about the available representations; such information may be made available for example via a manifest file. The video is split in a succession of small files (called segments) and encoded at different bitrate/resolutions corresponding to the different representations listed in the manifest. The client then downloads and plays the small files in the representation of interest. In case of variations in the available bandwidth, a video client can download video segments encoded at various bitrates to match the variations of available bandwidth. A representation also defines a packaging for video content, such as a file format and extension. Note that devices are typically not able to parse all file formats.

Video content is typically delivered over an IP network using a Content Delivery Network (CDN). A CDN is generally composed of a large number of servers. A Head-End video transcoder produces the different representations and sends them to an Origin Server which is the entry point on the CDN. Information about the contents stored at the Origin Server is made available to clients or playback devices. When a large number of clients are present in a region, a CDN usually comprises a server called an Edge Server to service clients in that region. The role of the Edge Server is to receive client requests from that region and send those client requests to the Origin Server. When multiple client requests for the same content are received by an Edge Server, the Edge Server is able to send only one request for the requested content to the Origin Server and dispatch the requested content locally to each requesting clients using a caching mechanism. This approach has the advantage of saving bandwidth within the CDN between the Origin Server and the Edge Server(s).

It is possible to achieve OTT delivery by encoding and packaging all possible representations of the video on the head-end transcoder, then sending, upon the requests of clients, video data all across the CDN. Undesirably, however, doing so would tend to saturate the bandwidth and the storage of the CDN. Indeed, with this approach each representation that has been requested by at least one client is sent throughout the CDN, thereby requiring a large amount of data to be sent through the CDN. Data is commonly stored on servers while it is delivered. Thus, if a large number of representations are sent over the CDN, a large number of OTT files will be stored on Origin Servers, Cache Servers, and Edge Servers during the delivery of the video.

A solution to this issue is Just-In Time Packaging (JITP) and Just-In-Time Transcoding (JITT). JITP and JITT are disclosed by Robinson et al., *HEVC Benefits and the Path to Deployment*, Society of Cable Telecommunication Engineers, Proceedings of the Cable-Tec Expo '14. In the solution disclosed by Robinson, only the highest resolution of the video in a single packaging is transmitted between the Head-End and the Edge Servers, and the video content is packaged and transcoded on the fly at the Edge Servers, for example to another video format or resolution, to meet the clients' requests. This solution offers the advantage of limiting the bandwidth consumed between the Head-End and the Edge Servers and storage consumption on the network.

A classical JITT solution induces a very heavy computing load on an Edge Server. Video encoding is a very complex operation that consumes a large amount of computational resources. The compression of video at an acceptable quality/rate ratio is performed through a large number of decisions on block types, size, and motion vectors, which are performed by a large number of encode options and iterations. All these loops, iterations, and decisions consume a lot of resources. Performing on-the-fly transcoding at an Edge Server as disclosed by Robinson becomes impossible at a reasonable cost and good quality/bitrate ratio when the number of representations in OTT delivery approaches the number required by a practical implementation.

European Patent Application No. 15305550.4, also filed by the Applicant of the instant application on Apr. 14, 2015, which is hereby incorporated by reference for all purposes as if fully set forth herein, discloses a solution to the above-mentioned problem. European Patent Application No. 15305550.4 discusses a video coding device that encodes a video in a first representation and computes symbols that define a correspondence between the decisions taken in the first representation and decisions in at least one further representation, having for example a resolution or video codec which is different from the first representation. Thus, an Edge Server, having access to the video encoded in the first representation and symbols of correspondence between decisions, is able to perform Just-In-Time Transcoding and serve end users with video content at an acceptable quality-rate ratio in a number of different representations while limiting the storage requirements for the video content.

The approach discussed by European Patent Application No. 15305550.4 is able to serve video content to users in a large number of different representations at an acceptable quality/rate ratio while limiting the storage needs on servers. However, encoding video using an Open GOP scheme offers an improved quality compared to encoding video using a Closed GOP scheme, but is difficult to use in this context when the content is available at variable representations/resolutions.

Conventional video coding methods use three types of frames: I or Intra-predicted frames, P or Predicted frames, and B or bi-directional frames. I frames can be decoded independently, like a static image. P frames use reference frames that were displayed previously. B frames use reference frames that may have been previously displayed or may have yet to be displayed. The use of reference frames involves encoding only the difference between a block in the current frame and a combination of blocks from reference frames.

A GOP is defined as the Group of Pictures between one I-frame and the next one in encoding/decoding order. In the prior art, the ability to switch between resolutions is primarily available using an encoding scheme called "closed GOP" at segment boundaries. Closed GOP refers to any block based encoding scheme where the information to decode a GOP is self-contained. This means that a GOP contains one I-frame, P-frames that only reference that I-frame and P frames within the GOP, and B-frames that only reference frames within the GOP. Thus, there is no need to obtain any reference frame from a prior GOP to decode the current GOP. When such a "Closed GOP" scheme is used at a segment boundary, it means that the first GOP of a new segment does not need any information from the previous GOP which belongs to the previous segment. By contrast, in the coding scheme called Open GOP, the first B frames which are displayed before the I-frame in a current GOP can reference frames from prior GOPs.

In state of the art implementations of an OTT scheme based on adaptive streaming technologies, an Open GOP coding scheme can be used inside a segment if the segment contains several GOPs, but it is not possible to use an Open GOP coding scheme for the first GOP of each segment in an manner that allows switching between resolutions, or more generally representations, at segment boundaries. To illustrate, a B frame in an Open GOP after a switch of resolutions would reference frames in the previous GOP that have a different resolution, which would lead to an inconsistency when decoding. To obtain consistent reference frames for the first B frames in a GOP after a switch, the player would need to request the prior segment in the resolution of the new segment, which is practically not feasible if bandwidth is constrained.

It is nearly impossible, by using segments whose first GOP is encoded in a Closed GOP scheme, to obtain in the same time an acceptable latency and a good quality of video. It is possible to obtain good video quality by dividing video content in very long segments that contain a large number of Open GOPs and a single closed GOP. However, using large segments leads to poor latency due to segment length. On the other hand, using a closed GOP encoding scheme with short segments leads to a better latency but poorer video quality experience, as quality changes between successive GOPs may be visible since there are no B frames to link the two GOPs by using reference frames in each of them.

European Patent Application No. 15305190.9, also filed by the Applicant of the instant application on Feb. 10, 2015, which is hereby incorporated by reference for all purposes as if fully set forth herein, discusses a video decoder which is able to decode video encoded in an Open GOP scheme despite changes of resolutions between segments. This video decoder is able to receive and decode video encoded in Open GOP at different resolutions, or more generally, different representations. The combination of JITT transcoding and such a decoder enables video content to be served in OTT in a number of different representations while limiting the storage and computational needs of the servers while providing an optimal quality-bitrate ratio of video, using good video coding decisions, and supporting an Open GOP coding scheme.

However the specifications of existing standards have not yet been adapted to such decoders. Thus, it is in many cases impossible for an OTT Edge Server receiving requests from a large number of different clients to ensure that the corresponding video decoders will properly decode video when changing resolutions or representations in an Open GOP scheme.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
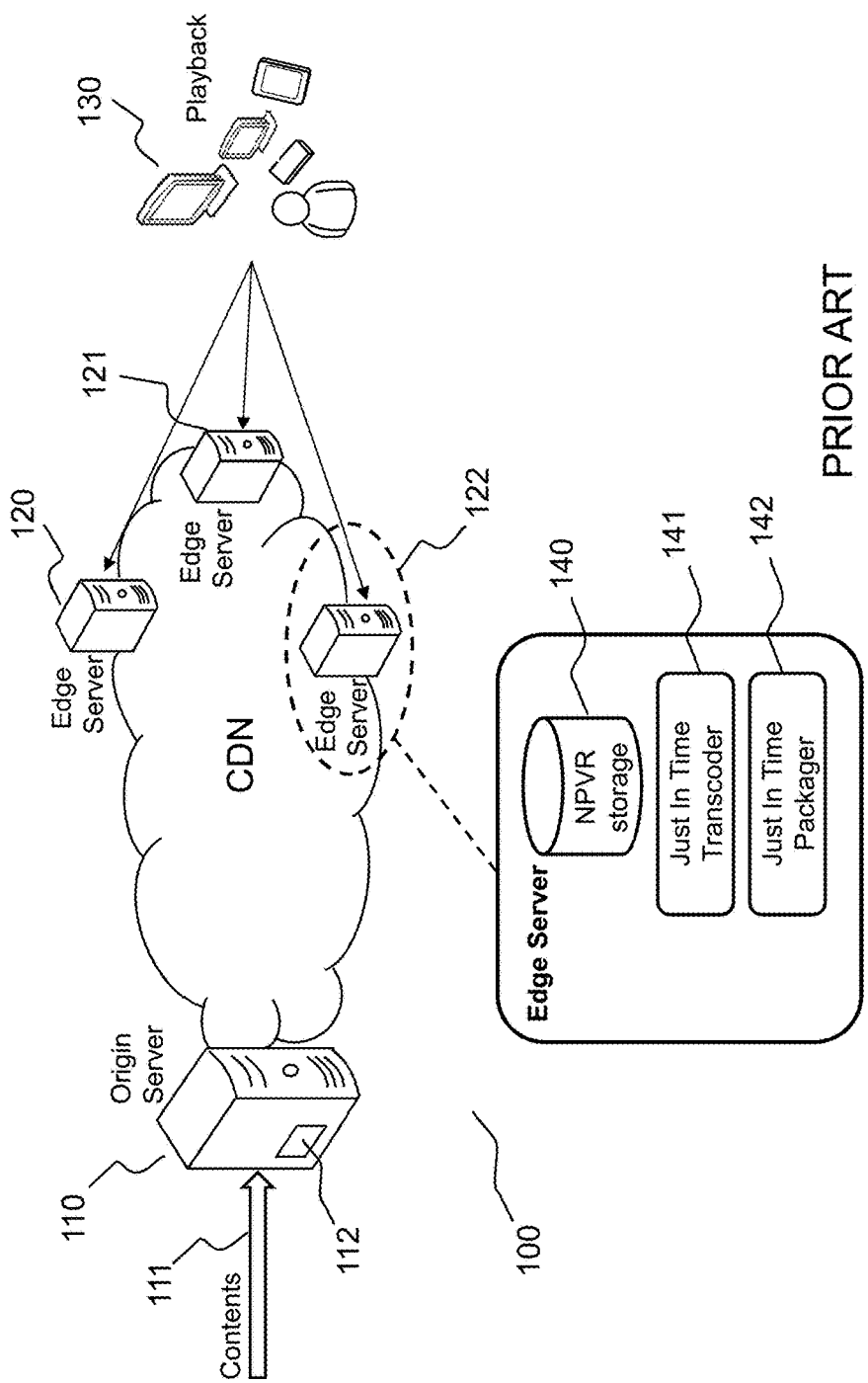
FIG. 1 illustrates a generic video delivery network according to the prior art.

Approaches for delivering digital video to a user terminal are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

There is a need in the existing state of the art for a video server which is able to serve video clients with OTT video content in a number of different representations while (a) limiting the number of video representations that must be stored so that the video server can serve video content at a high quality-bitrate ratio using an Open-GOP scheme and (b) ensuring that the served video is properly decoded by a standard video decoder.

To this effect, embodiments of the invention are directed towards a video server that comprises an input port configured to receive, from a user terminal, requests to deliver video segments, where each video segment is in a target representation. The video server of an embodiment also comprises an output port configured to deliver the requested video segments to the user terminal. The video server of an embodiment further includes a data link configured to retrieve from storage, for each request from the user terminal, a video segment in at least one source representation in an Open GOP scheme. The video server of an embodiment also may perform video transcoding by transcoding at least a part of the video segment in at least one source representation in an Open GOP scheme into the requested target representation in a Closed GOP scheme, where the requested target representation is different from a representation previously provided to the user terminal.

Advantageously, video segments form a sequence representative of a video track, and the video server is configured to transcode all or part of the video segments if the target representation is different from the representation provided to the user terminal for the preceding segment in the sequence. In an embodiment, transcoding all or a part of the video segment comprises re-encoding a bi-directional frame which has a reference frame in a previous segment so that it references only an intra-predicted frame within the segment.

In another embodiment, the video server is further configured to transcode a video segment from a source representation to a target representation if the target representation is different than at least one of the source representations.

In another embodiment, the video server is further configured to use the data link to retrieve, from one or more non-transitory storage mediums for persistently storing digital data (also referred to herein as 'storage capabilities'), symbols representative of a correspondence of video coding decisions in one of the at least one source representation and video coding decisions in the target representation, provide those symbols to one or more video transcoders as an input parameters, and employing the one or more transcoders to transcode the video segment from one of the at least one source representation to the target representation.

In an embodiment, the target representation may be selected by the user using a user terminal that displays a list of possible target representations. A representation may be defined by at least one of a resolution, a bitrate, a video codec, and a packaging format.

In an embodiment, the data link may correspond to or be implemented by a data bus. In such an embodiment, storage capabilities may reside on the same physical machine as the video server in an embodiment. In another embodiment, the data link may correspond to or be implemented by a connection to one or more other servers. In this embodiment, storage capabilities may reside on one or more separate physical machines which are accessible to the video server over the data link.

Embodiments of the invention also encompass approaches for delivering video content to a user terminal. An exemplary approach may involve, for example (a) receiving from a user terminal a request to deliver a video segment in a target representation, (b) retrieving, from storage capabilities, the video segment in at least one source representation in an Open GOP scheme, (c) upon determining that the target representation is different from a representation previously provided to the user terminal, transcoding at least a part of the video segment in the at least one source representation in an Open GOP scheme into the target representation in a Closed GOP scheme, and (d) delivering the video segments in the target representation to the user terminal.

Embodiments of the invention also encompass one or more non-transitory computer readable storage mediums storing one or more sequences of instructions, which when executed by one or more processors, cause a video server to (a) receiving from a user terminal a request to deliver a video segment in a target representation, (b) retrieving, from storage capabilities, the video segment in at least one source representation in an Open GOP scheme, (c) upon determining that the target representation is different from a representation previously provided to the user terminal, transcoding at least a part of the video segment in the at least one source representation in an Open GOP scheme into the target representation in a Closed GOP scheme, and (d) delivering the video segments in the target representation to the user terminal.

Embodiments of the invention may also be embodied as a user terminal configured to retrieve video content from a content delivery network. The user terminal of such an embodiment may include an output port configured to send to a video server a request to deliver a video segment in a target representation. The target representation may depend on one of more of a hardware or software configuration of the user terminal, an available bandwidth, a state of a connection of the user terminal to a content delivery network, and an energy available at the user terminal. The user terminal may also include an input port configured to receive the requested video segments. The user terminal may include video decoding capabilities that include the capability to receive a video segment in a Closed GOP scheme if the video segment has a target representation which is different from a representation previously requested by said user terminal and receive a video segment in an Open GOP scheme if the video segment has a target representation which is similar to a representation previously requested by said user terminal.

Advantageously, the user terminal may be further configured to select a target representation in a list of candidate target representations. Such selection of a target representation may be performed by (a) determining a maximum bitrate threshold according to one of the available bandwidth and the state of the connection of the user terminal to the content delivery network, (b) attributing, to some of the candidate target representations in the list, an index of quality based on their resolution and their bitrate for a segment of video encoded in an Open GOP scheme, and (c) selecting the candidate target representation which has the best index of quality while having a bit rate below the maximum bitrate threshold.

Embodiments allow for the delivery of segments of video to user terminals in a large number of different representations at an optimal quality-rate ratio. Embodiments allow for saving both storage and computing capabilities on video servers. Embodiments are fully compatible with existing user terminals and standard decoders. Embodiments improve the quality of service of OTT video delivery. Embodiments are applicable to any video standard which supports bi-directional frames.

Embodiments of the invention may be incorporated into a video server without modifying the interface between the video server and user terminals.

Delivering Video in a Target Representation

Embodiments shall be described by way of examples related to delivering video in an OTT mode. However, embodiments are not restricted to the specific examples discussed herein as the approaches discussed herein can be applied to any video server which is configured to send successive video segments to a user terminal in an Open GOP mode, where the user terminal can request the segments in different representations.

FIG. 1 displays a generic video delivery network 100 of the prior art. The generic video delivery network 100 of FIG. 1 may be a Content Delivery Network (CDN), which is usually a large system of servers deployed in multiple data centers across the Internet. The goal of a CDN is to serve digital video to a large number of end-users with high availability and high performance.

Generic video delivery network 100 may be used for video delivery or streaming, for example using OTT video delivery. Generic video delivery network 100 comprises a head-end server and an origin server 110.

The head-end server receives video content 111. Video content 111 is usually of very high quality. Video content 111 may for example be baseband video. Video content 111 may also be video stored in high quality storage format, such as Apple ProRes™, or video compressed in a very high bitrate (mezzanine or pivot format). Video content 111 can be produced in real time, for example for streaming live sport events or TV shows. Video content 111 can also be or correspond to pre-recorded or stored content, for example in the case of Video-On-Demand (VOD) delivery. The head-end server may also comprise a head-end video transcoder 112, which may be configured to transcode very high quality video content 111 in a more compressed form, in order to save storage at origin server 110. Content transcoded and stored by origin server 110 may be encoded at a lower bitrate than video content 111 and remain of a relatively high bitrate/quality.

Generic video delivery network 100 further comprises a large number of servers in connection with each other in order to serve end users 130 equipped with playback devices. End users 130 send requests to the generic video delivery network to receive video content. In order to save bandwidth within generic video delivery network 100, when a large number of end users are present in an area, an edge server 120, 121 or 122 is placed in that area. The users in that area then send their requests to an edge server 120, 121, 122 in their area rather than to origin server 110. When edge servers 120, 121, 122 receive requests for the same content from a plurality of users, edge servers 120, 121, 122 are configured to send a single request to origin server 110, receive the content, and transfer the content to end users 130.

The network architecture of FIG. 1 allows for the delivery of video content with high availability and high performance to end users 130. Origin server 110 can make available to users a large amount of different video content. Meanwhile, the limitation of the number of requests between edge servers 120, 121, 122 and origin server 110 reduces the bandwidth consumed within generic video delivery network 100. Edge servers 120, 121 and 122 and origin server 110 usually communicate over the Internet backbone, which is the long-distance and high-capability data backbone that defines the "skeleton" of the Internet network.

The use of the Internet backbone between edge servers 120, 121, 122 and origin server 110 enables the production of video content to be centralized on a single server which can be located far away from end-users, and therefore, concentrates the production of a large number of different video contents in a single place in order to serve end users with the greatest variety of video contents. Meanwhile, the coordination of client requests by the edge servers 120, 121, 122 allows end-users 130 to access this variety of video contents without saturating the Internet backbone.

There is today an important shift towards delivering video in the OTT mode. In OTT delivery, video content is split into small video files. Video content is defined by a sequence of these small files. Upon receiving a request for video content from a user device, sequences of files are sent to requesting end user devices. These files are then played successively to produce a continuous video playback. OTT delivery can be performed using packaging technologies such as HLS developed by Apple, HDS developed by Adobe, Smooth Streaming developed by Microsoft, or MPEG Dash standardized by the ISO/CEN MPEG organization.

Using these technologies, end users are generally able to retrieve a list of available representations of the video content. A representation of the video content defines the characteristics of the video files. These characteristics may include, for example, the compression format or standard, the resolution, and the bitrate of the video. They may also include various encoding options and the packaging of the video. The packaging of the video defines the way video files are organized, for example file format and extension. An end-user and/or playback device is therefore able to choose the best representation according to network and playback features. The end-user may for example choose the resolution which is the closest to the playback resolution. The playback device may also select a compression standard according to the video decoders which are available on the playback device. The playback device may also select a desired bitrate to obtain the video with the highest quality for a video playback in real time.

In order to serve a high number of end-users with very diverse playback capabilities, video content to be distributed in an OTT mode is usually available in a large number of different representations. These different representations of the video content represent the large number of possible combinations between compression formats, bitrates, resolutions, file packaging, and the like. The delivery of video content in all representations that have been requested by at least one end-user between the origin server 110 and the edge servers 120, 121, 122 would therefore have the undesirable effect of sending a large amount of data between origin server 110 and edge servers 120, 121, 122. Furthermore, having to store in any part of the network, centrally or on the edge, all the representations can have a huge impact on the required storage capacities.

To solve this issue, edge servers 120, 121, 122 can be configured to perform Just-In-Time Packaging (JITP) and Just-In-Time Transcoding (JITT). In addition, edge servers 120, 121, 122 can be equipped with Network Personal Video Recorder (NPVR) storage 140. NPVR storage 140 is used to store OTT video files to offer the PVR capability to the end user. Edge servers 120, 121, 122 with the NPVR capability can also contain a Just-In-Time Transcoder 141 and Just-In-Time Packager 142. In JITT and JITP, only the representation of video content with the highest quality is propagated by origin server 110 to edge servers 120, 121, 122 when the content is requested once. Then, edge servers 120, 121, 122 transcode and package video content on-the-fly for delivering to every end-user the video content in his preferred representation. This method has the advantage of limiting the amount of data that transit between origin server 110 and edge servers 120, 121, 122. It also limits the NPVR storage needs in edge servers 120, 121, 122, since edge servers 120, 121, 122 do not need to store OTT files for all representations that are requested by the end-user that can use devices of different types and in different network bandwidth situations.

However, this solution can potentially lead to a huge computation load on edge servers 120, 121, 122. Indeed, video transcoding is a very computationally intensive task. When applied to a large number of different video contents and representations, the calculation capabilities needed to perform on-the-fly transcoding can lead to an unacceptable deployment cost that renders this solution unsustainable if an appropriate architecture is not used.

Figure 2A:
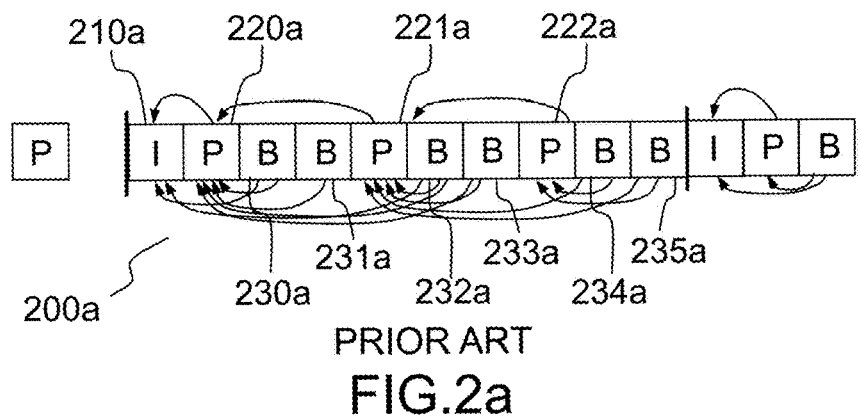
FIG. 2a illustrates an example of segments of OTT video data using a closed GOP scheme according to the prior art.
Figure 2B:
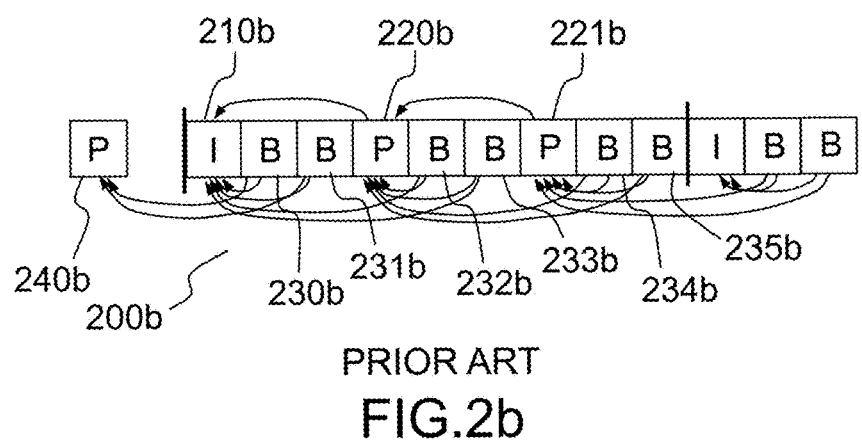
FIG. 2b illustrates an example of segments of OTT video data using an open GOP scheme according to the prior art.

FIGS. 2a and 2b display two examples of segments of OTT video data according to the prior art, respectively using a closed GOP and an open GOP scheme.

FIG. 2a displays an example of a segment of OTT video data using a closed GOP scheme according to the prior art. The segment displayed on FIG. 2a illustrates the case where the segment comprises a single GOP. However, segments are not restricted to a single GOP and many of them comprise a plurality of GOPs. GOP 200a comprises a single I frame 210a, three P frames 220a, 221a and 222a, and six B frames 230a, 231a, 232a, 233a, 234a and 235a. Each P frame 220a, 221a and 222a reference a single frame, respectively 210a, 220a and 221a. In contrast, each B frame references two frames: B frames 230a and 232a reference frames 210a and 220a, B frames 232a and 233a reference frames 220a and 221a, and B frames 234a and 235a reference frames 221a and 222a. All frames in the GOP 200a, including B frames, reference only frames within GOP 200a. Therefore, all information necessary to decode GOP 200a is comprised within GOP 200a, which is the definition of closed GOP. For a longer segment comprising more than 1 GOP, this Closed GOP restriction is usually applied, in the state of the art, only for the first GOP of the segment.

It is important to note that FIG. 2a displays a segment and GOP 200a in decoding order and not the displayed order. Therefore, a first frame which serves as reference to a second frame is always placed left to said second frame, even if it is displayed afterwards. For example, frames 230a and 231a use as reference frames 210a and 220a, and frame 220a uses as reference frame 210a. Therefore, frames are represented in the following order: 210a, 220a, 230a and 231a. Meanwhile, frame 220a is displayed to the user after frames 230a and 231a. Frames 230a and 231a are called B-frames for bi-predicted frames because they can use two reference frames for the prediction. The usual way of building bi-prediction is to choose one frame which will be displayed before and one frame which will be displayed after. This property makes the compression of B frames more efficient than the compression of P frames, and much more efficient than the compression of I frames.

The maximum number of successive B frames is an important parameter of video encoding. Typical number of successive B frames range from 1 to 7. A lower number of B frames leads to a higher proportion of P frames in the video, and therefore lowers the compression efficiency. On the other hand, a higher number of B frames forces P to use more distant frames as references. More distant frames tend to contain blocks with more significant differences, which makes motion compensation less efficient if the number of successive B frames is too important. A higher number of B frames increases also the latency for the reordering of frames in the display order.

FIG. 2b displays a second example of a segment of OTT video data using a full open GOP scheme according to the prior art. The segment of FIG. 2b comprises a single GOP 200b. GOP 200b comprises a single I frame 210b, two P frames 220b and 221b, and six B frames 230b, 231b, 232b, 233b, 234b and 235b. The frame 240b is the last P frame of the GOP in video content that precedes GOP 200b. Unlike GOP 200a, GOP 200b comprises two B frames 230b and 231b which reference a frame in GOP 200b itself (I frame 210b), but also the frame 240b from a previous GOP. This characteristic is representative of the full Open GOP scheme. Moreover, in this example, frame 240b is also located in the previous segment. In full open GOP scheme, it is also possible to have GOPs comprising only I and B frames. Indeed, in certain video standards such as AVC or HEVC, B frames can be reference pictures for other B frames. Therefore, it is possible to replace P frames with B frames, since a P frame is a particular case of a B frame in which only one single prediction is used.

A full Open GOP scheme has better compression efficiency. Indeed, using the same maximum number of successive B frames (2), GOP 200b has a higher ratio of B frames than GOP 200a: 6 B frames on 9 frames instead of 6 B frames on 10 frames. B frames being encoded more efficiently than I and P frames, this leads to increased compression efficiency. This increased ratio is possible because the use of frame 240b from a previous GOP as reference allows the removal of one P frame in GOP 200b, which corresponds to the frame 222a in GOP 200a. Moreover, the B frames being predicted from a frame of the previous GOP/segment and a frame of the current GOP/segment will generate a smooth transition from the quality level of the last frames of the previous GOP/segment and the quality level of the first frames of the current GOP/segment. This avoids an artifact of visible Intra refreshments.

Figure 3:
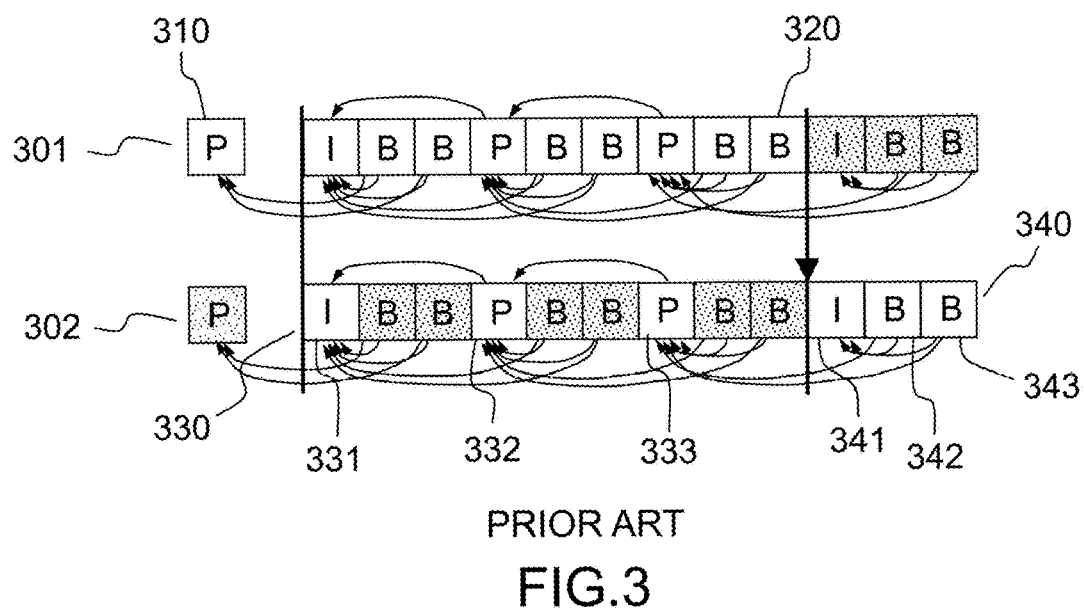
FIG. 3 illustrates the data needed for performing a switch of resolution in an Open GOP mode according to the prior art.

FIG. 3 illustrates the data needed for performing a switch of resolution in an Open GOP mode according to the prior art. In this example, an OTT video decoding device can pick up segments encoded in two different resolutions, namely resolution 301 and resolution 302. Three successive segments are displayed by FIG. 3. A first and second segments encoded at resolution 301 are respectively noted 310 and 320. The second and third segments, encoded at resolution 302, are respectively noted 330 and 340. The decoder is able to select, for each segment, a resolution that best suits its needs. The decoder may for example switch from resolution 301 to resolution 302 between the second and the third segment. This behavior may be desirable, for example, if resolution 302 is lower than resolution 301, and if the available bandwidth is such that the decoding device is not able anymore to receive a segment encoded at resolution 301 in real time.

The video content depicted by FIG. 3 is encoded using an Open GOP scheme. Therefore, the first B frames group in each segment has a reference in previous segments. For example, B frames 342 and 343 in GOP 340 reference I frame 341 within GOP 340, but also P frame 333 in GOP 330. P frame 233 itself uses as reference P frame 332, which uses as reference I frame 331. Therefore, it is not possible in the prior art to display GOP 340 without having received GOP 330. Thus, according to the prior art, a switch of resolution in an Open GOP scheme implies receiving a set of frames twice, and therefore useless data, the frames in segment 330 which are received but not displayed being represented in grey. This is particularly problematic when switching to a lower resolution, because the reception of useless data occurs when there is a limited bandwidth for transmission of data.

Figure 4A:
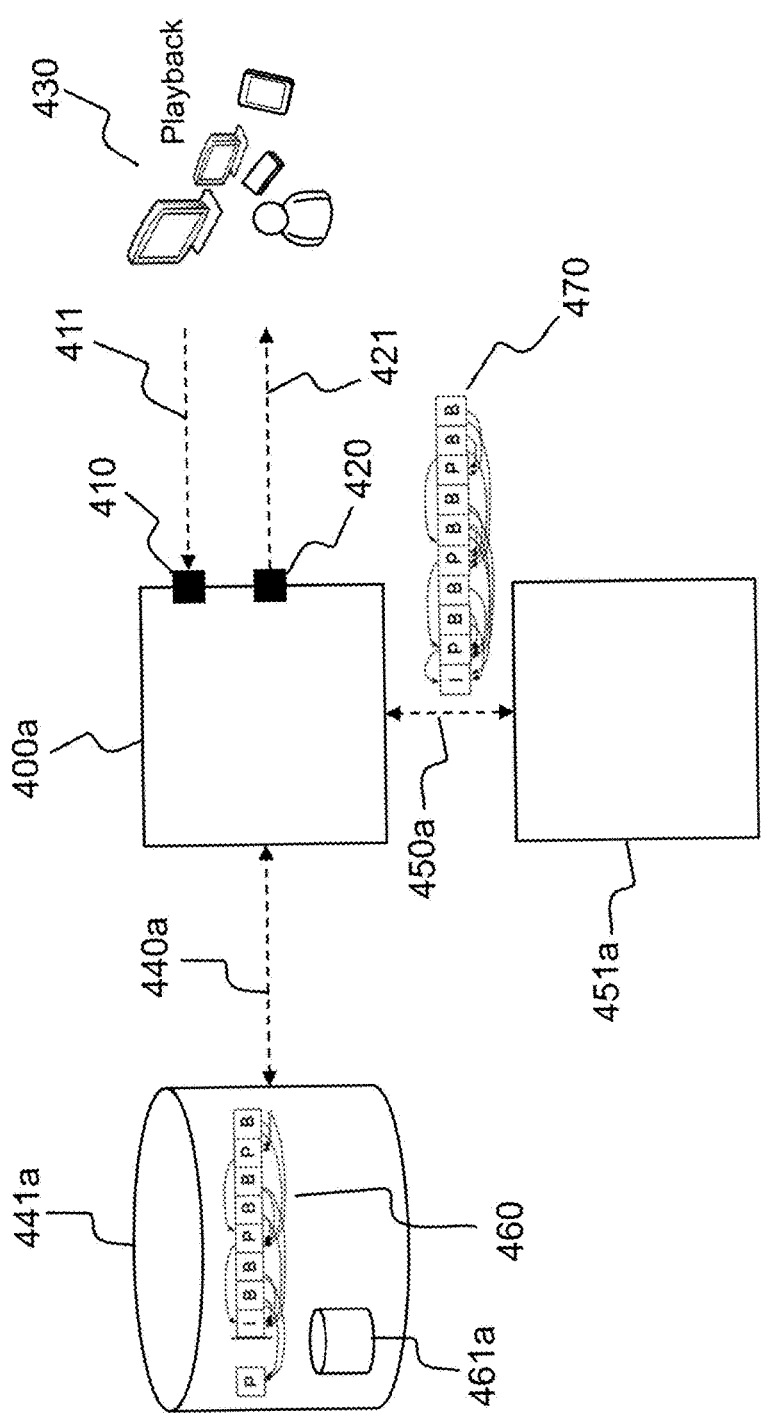
FIGS. 4a, 4b, 4c, illustrate three examples of video servers according to various embodiments of the invention.
Figure 4B:
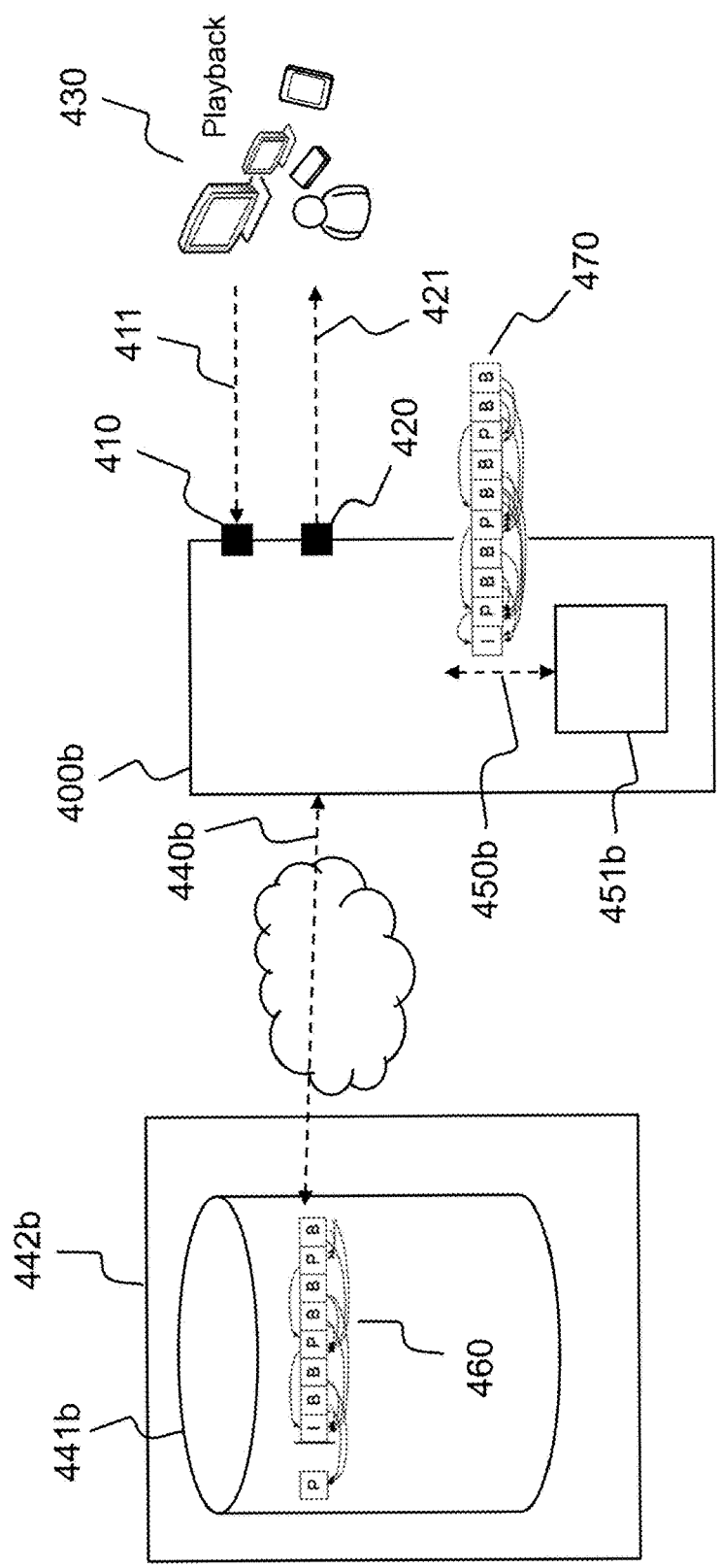
Figure 4C:
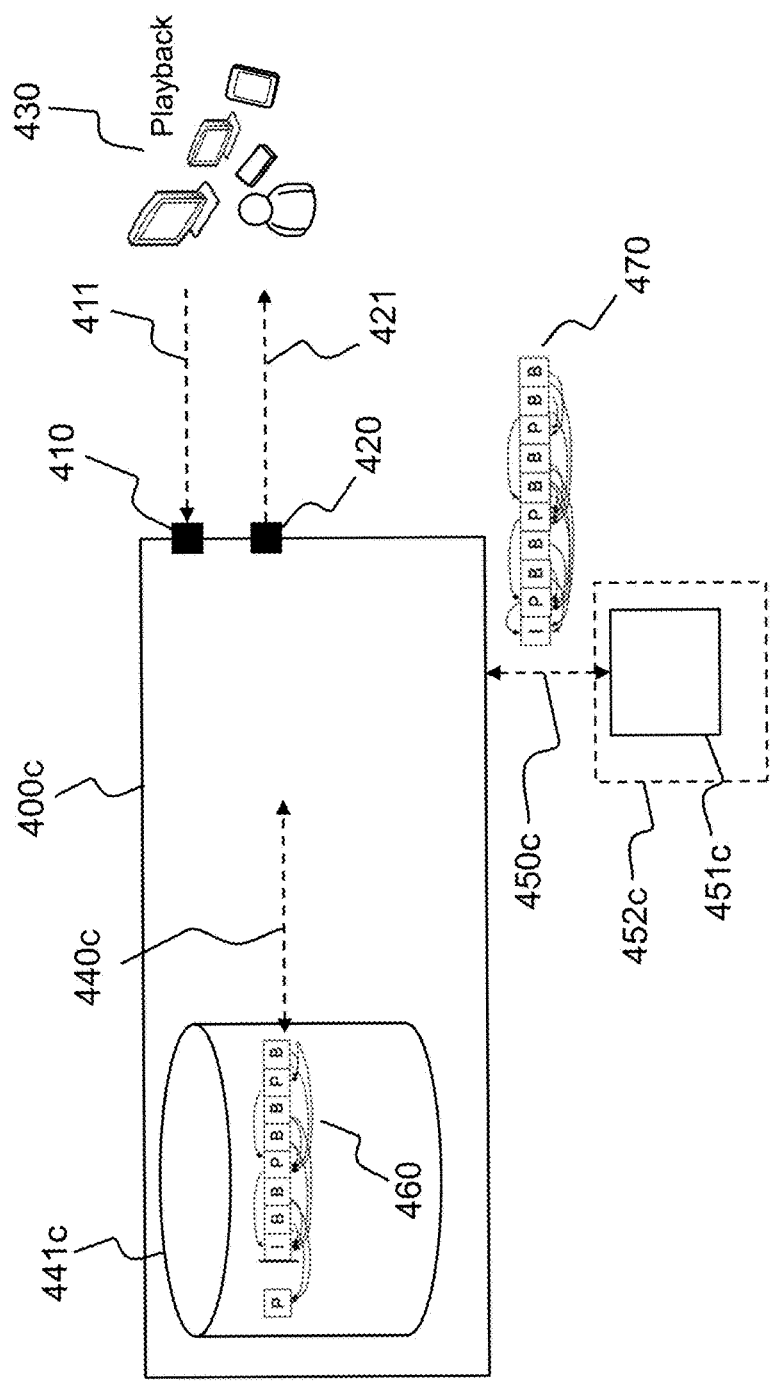

FIGS. 4a, 4b, 4c, illustrate three examples of video servers according to various embodiments of the invention. FIG. 4a illustrates a video server according to a first embodiment of the invention. Video server 400a of FIG. 4a may correspond to a physical machine, software executing on a server or other such physical machine, or an Operating-System Level Virtual Environment such as a Virtual Machine or a Linux Container.

Video server 400a comprises an input port 410 configured to receive from a user terminal 430 requests 411 to deliver video segments, where each delivered video segment is in a target representation. User terminal 430 can be used for video playback, comprise video playback and decoding capabilities, and may send requests to video server 400a to deliver video segments in an OTT mode.

Video server 400a further comprises an output port 420 configured to deliver the requested video segments 421 to user terminal 430. The video segments can be encoded in any type of video format and can be decoded by the user terminal. Such formats may be for example H.264-AVC (Advanced Video Coding), H.265-HEVC (High Efficiency Video Coding), MPEG-2, VP8, VP9, and VP10. Output port 420 may be used to deliver segments of video in an OTT mode to user terminal 430. As explained above, in OTT mode the user terminal 430 may be configured to send requests to receive successive segments in different representations in order to playback the video with the best possible quality according to the available bandwidth.

Video server 400a further comprises a data link 440a to retrieve from storage capabilities 441a, for each request from user terminal 430, a video segment in at least one source representation 460 in an Open GOP coding scheme 460.

The video content is stored in at least one source representation in storage capabilities 441a. These storage capabilities may generally be any type of non-transitory computer storage known by a person of ordinary skill in the art, for example a hard disk drive, a magnetic storage, a flash memory, a Solid-State Drive, or a partition thereof. When the video server 400a receives a request 411 from user terminal 430, video server 400a retrieves the corresponding segment of video from storage capabilities 441a. Storing the video content in source representations in an Open GOP scheme rather than in a closed GOP scheme permits to provide a better quality of experience for a given storage capabilities 441a, since video encoded in a closed GOP scheme exhibits a better video quality than a video encoded in a closed GOP scheme for the same bitrate.

A wide variety of modes of access to storage capabilities 441a are possible. According to various embodiments of the invention, storage capabilities 441a can be located within video server 400a and accessed using a local data bus. Storage capabilities 441a may also be located within an additional server and accessed by video server 400a using a network connection. In embodiments where video server 400a is an Operating-System Level Virtual Environment, storage capabilities 441a may be located on the same physical machine as video server 400a, while being managed by another Operating-System Level Virtual Environment executing on the same physical machine. Several examples will be described below.

Video server 400a may further comprise an access 450a to one or more video transcoding capabilities 451a. In this application, an access to video transcoding capabilities is a data link to send to video capabilities compressed video data, and parameters of transcoding, and receive back transcoded video data. Transcoding parameters can be any parameter used in video encoding, for example the bitrate, the maximum number of consecutive B-frames, the output video codec, and the like. Transcoding capabilities may be of any type of processing unit programmed or configured for transcoding video, for example, a CPU (Central Processing Unit), a microprocessor, a GPU (Graphics Processing Unit), or a FPGA (Field Programmable Gate Array). If the representation requested by the user terminal is not available as a source representation in the storage capabilities, video server 400a can request the transcoding capabilities 451a to transcode a segment from 441a into the target representation. Thus, user terminal 430 can have access to a large number of different representations, but only a part of them need to be stored on storage capabilities 441a, thereby saving storage space.

According to various embodiments of the invention, transcoding capabilities can be located in the server 400a, or in an additional machine, which may be another physical machine, or another Operating-System Level Virtualization executing on the same physical machine as server 400a. Several examples of distribution of processing capabilities on the server 400a or in further server are described with reference to FIGS. 4b and 4c.

In OTT delivery, the user terminal can request successive segments of video in different representations. Since the segments in the at least one source representation 460 are in an Open GOP mode, they cannot be sent directly to the user terminal. Indeed, in Open GOP at least one frame in each segment has frames which reference a frame in the previous segment. Thus, if the two successive segments belong to different representation having a different video resolution or encoding scheme, an error can occur in the decoder because a frame uses a reference frame in the wrong representation, such as for example having the wrong resolution.

Such mismatch between a frame and a reference frame can result in dramatic errors in the user terminal when decoding video, such as an image freeze, a dark screen, or even crash of the decoder. As the handling of such inconsistencies is not standardized in decoders, the behavior of a video decoder in this case is thus unpredictable.

In order to solve this issue, video server 400a is configured to cause one or more video transcoding capabilities to transcode at least a part of the video segment in at least one source representation in an Open GOP scheme into the video segment in the requested target representation in a Closed GOP scheme 470, when the requested target representation is different from a representation previously requested by the user terminal.

Doing so provides several advantages. The user terminal can request video segments in a large number of different representations, and can thus adapt video reception to variations of bandwidth. Meanwhile, the video can be sent to the user terminal in an Open GOP scheme, except when the representation requested by the user terminal changes. Thus, the video sent to the user terminal has a better quality/rate ratio than if it were encoded in a Closed GOP scheme, which saves bandwidth between the video server 400a and user terminal 430. When the user terminal changes the video representation it is requesting, the corresponding video segment 470 is sent in a closed GOP scheme. Thus, user terminal 430 is able to decode the segment properly. Video formats usually exhibit syntax elements in the video stream, which indicate that the resolution changes and the frames which are referenced. The video decoder is thus able to adapt its behavior to decode the frames properly. Meanwhile, the video segments in the at least one source representation 460 are stored in an Open GOP mode, which permits to guarantee an optimum video quality for a given storage capability 441a.

The transcoding can generally be performed when a frame in a video segment references a frame in a previous video segment which has been requested in a different resolution. In an embodiment, segments form a sequence, and the video server is configured to cause the one or more video transcoding capabilities to transcode all or a part of the video segment if the target representation is different from the representation requested by the user terminal for the segment preceding the video segment in the sequence. In this example, the transcoding is performed if the representation requested by the user terminal is different from a representation previously requested. This works fine in any case where the representation delivered or provided to the user is identical to the representation requested. In other embodiments of the invention, the video server compares the representation requested by the user terminal to a representation previously delivered or provided to the user in order to ensure that the user terminal is able to properly decode the video, if for any reason a segment has been previously provided to the user terminal in a representation different from the representation requested by the user terminal.

According to embodiments of the invention, if a source representation is identical to the target representation requested by user terminal 430, video server 400a retrieves the segment in the target representation in Open GOP, and re-encodes the bi-directional frames in order that they reference only frames within the same segment. This allows creating a segment in Closed GOP from a segment in Open GOP while limiting the computing load in transcoding capabilities. Indeed, while some bi-directional frames in the beginning of the segment are transcoded, the other frames are not modified.

In a number of embodiments of the invention, if no source representation is identical to the target representation of a video segment, video server 400a is configured to cause one or more video transcoding capabilities to transcode the video segment from a source representation to the target representation. This allows user terminal 430 to request video segments in a large number of different target representations, while limiting the number of source representations to store on the storage capabilities, thus saving storage space.

In a number of embodiments of the invention, storage capabilities 441a further store symbols 461a representative of a correspondence of video coding decisions in a source representation and video coding decisions in a target representation. These symbols have been pre-calculate, and permit to transcode very rapidly and efficiently a video segment from a source to a target representation. In these embodiments of the invention, video server 400a is configured to use the data link to retrieve from the storage capabilities 441a the symbols 461a, and provide these symbols to the one or more video transcoding capabilities 451a as an input parameter to transcode the video segment from the source representation to the target representation.

This allows the transcoding capabilities 451a to transcode the video with a minimum number of decisions, if any, to perform. Thus, video segments can be transcoded from a source representation to a target representation with a very low computing load, which permits in the same time to (a) increase the quality of service provided to the user terminal by increasing the number of possible target representations, (b) save storage capabilities by limiting the number of source representations, and (c) reduce the computing load to transcode the video from a source to a target representation since decisions are inferred, from the symbols and decisions in the source representation, rather than being computed.

European Patent Application n° 15305550.4, mentioned above, discusses techniques for doing so. Notably, symbols 461a may be representative of a correspondence between a first set of video coding decisions in a source representation and a second set of video coding decisions in a target representation. Symbols 461a may either represent decisions in the second set of video coding decisions, in relation to decisions in the first set of video coding decisions, or rules of conversions of decisions in the first set of video coding decisions into decisions of the second set of video coding decisions. Such video coding decisions may for example comprise one of a determination of a block partition, a determination of a block type, a determination of a motion vector, an intra prediction mode, and a determination of a transform type.

According to various embodiments of the invention, different relations are possible between source and target representation. For example, one source representation may exist for each target representation. Thus, there is only the need to transcode the B frames which reference a previous segment, when there is a change of the target representation requested by the user terminal. It is also possible to store video content in storage capabilities 441a in a single source representation which correspond to the target representation with the highest resolution and/or bitrate. Thus, the storage needs of storage capabilities 441a is reduced without prejudice to the quality of the video in any target representation. It is also possible to have one source representation for each possible resolution of the target representations at the highest target bitrate for this representation. Thus, if user terminal 430 requests a video segment in a target representation which does not correspond to a source representation, video server 400a is configured to retrieve the video segment in the source representation having the same resolution and transcode the video segment from the source representation to the target representation. Thus, the storage needs in storage capabilities 441a remain at a reasonable level, and transcoding video segments at the same resolution can be performed at a reasonable computing cost.

FIG. 4b illustrates an embodiment of the invention involving the delivery of video in OTT mode in a CDN comprising a head-end server 442b and an edge server 400b. Video server 400b is similar to video server 400a; data link 440a, storage capabilities 441a, and access 450a to one or more video transcoding capabilities 451a of FIG. 4a are replaced in FIG. 4b by a data link 440b, storage capabilities 441b, and access 450b to one or more video transcoding capabilities 451b respectively.

Transcoding capabilities 451b are computing capabilities of video server 400b. For example, if video server 400b is a physical machine, video transcoding capabilities 451b can be processing capabilities of that physical machine, and access 450b may correspond to an internal data bus. If video server 400b is a Virtual Machine, then transcoding capabilities 451b can be a part of processing capabilities of the physical machine on which the Virtual Machine executes that are reserved for the Virtual Machine.

Storage capabilities 441b are located in distant server 442b, which can be for example any Network Attached Storage capabilities located inside the CDN, the data link 440b being a data link in the CDN in which video server 400b can send requests to the head-end server 442b, and receive data back across the network.

FIG. 4c illustrates an embodiment of the invention wherein client 430 requests video content to a video server 400c which stores locally video segments in source resolutions. Video server 400c is part of a cluster of local machines, the other local, or remote machines being used to transcode the video when appropriate.

Video server 400c is similar to video server 400a; data link 440a, storage capabilities 441a, and access 450a to one or more video transcoding capabilities 451a of FIG. 4a are replaced by a data link 440b, storage capabilities 441c, and access 450c to one or more video transcoding capabilities 451c in FIG. 4c respectively.

Storage capabilities 441c are storage capabilities of video server 400c. For example, if the server 400c is a physical machine, then storage capabilities 441c may correspond to a hard drive of the physical machine and data link 440d may correspond to an internal data bus. If video server 400c is a Virtual Machine, then storage capabilities 441c can be a part of storage capabilities of the physical machine on which the Virtual Machine is executing that are reserved for the Virtual Machine.

Transcoding capabilities 451c are located in an additional machine 452c, which can be for example a physical or Virtual Machine dedicated to video transcoding. When appropriate, video server 400c can request video transcoding capabilities 451c to transcode all or a part of video segments. Thus, access 450c to transcoding capabilities 451c comprises requests to the further server 452c.

These examples demonstrate possible architectures and functionalities of a video server according to the invention. Other possible embodiments, architectures and functionalities are however possible and may become apparent to a person of ordinary skill.

Figure 5:
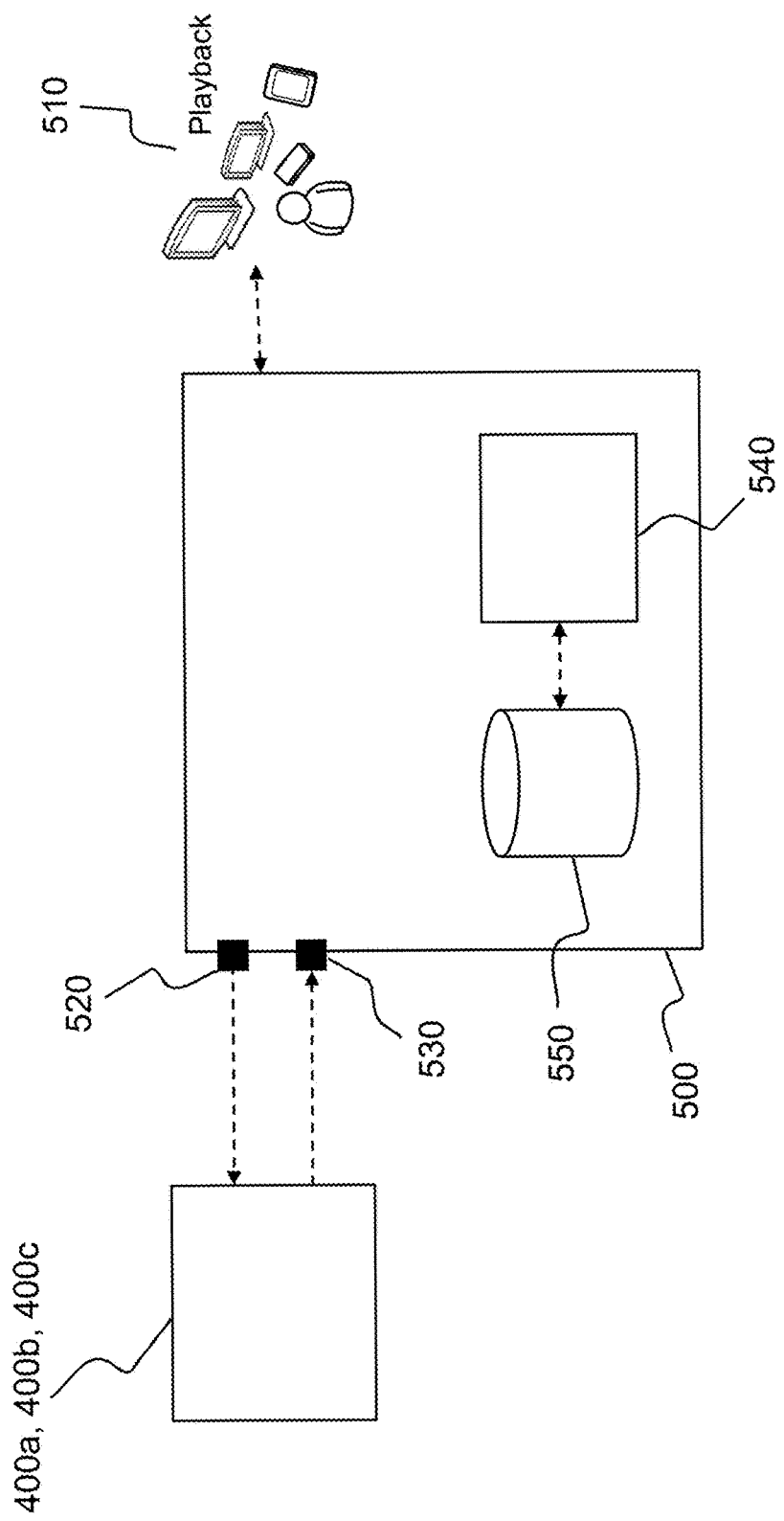
FIG. 5 illustrates a user terminal according to an embodiments of the invention.

FIG. 5 illustrates a user terminal according to various embodiments of the invention. User terminal 500 comprises video playback capabilities 510 to display a video to a user. User terminal 500 is configured to receive video segments from a video server according to an embodiment of the invention. To do so, user terminal 500 comprises an output port 520 configured to send to a video server, for example a video server 400a, 400b, 400c according to an embodiment, requests to deliver video segments, each requested video segment being in an a target representation. User terminal 500 also comprises an input port 530 configured to receive the requested video segments.

User terminal 500 is configured to send requests for video segments in different resolutions according at least to the available bandwidth. For example, user terminal 500 may be configured to send requests to receive video segments at a bitrate which is the highest possible that allows the playback of video in real time. In this way, the user can enjoy the video with the highest possible quality according to variations of the bandwidth. User terminal 500 may also be configured to select representations with different resolutions according to the available bandwidth. Indeed, it is well known that some video resolutions are better suited for given bitrates. Generally, a high resolution produces better results for high bitrate video while it is preferable to lower the resolution of the video for low bitrates.

User terminal 500 may also use, in conjunction with the bandwidth, other parameters and rules to select the appropriate representation of each video segment. The user may for example limit the resolution of video according to an available computing power. For example, when user terminal 500 executes several tasks in parallel, user terminal 500 may have a limited processing power available for video decoding, and request video segments at a low resolution, which should be decoded with less computing power than a video at a high resolution.

User terminal 500 receives video segments in a compressed form. Thus, user terminal 500 comprises video decoding capabilities 540 to decode received video segments. In order to avoid problems of frame references and using the segments transmitted by the video server while improving the quality-rate ratio of the video received compared to prior art user terminals, user terminal 500 is configured to receive a video segment in a Closed GOP scheme if the requested target representation is different from a previously requested target representation and to receive a video segment in an Open GOP scheme if the target representation is identical to a previously requested representation. According to various embodiments of the invention, the video segments form a sequence, and user terminal 500 is configured to receive a video segment in a Closed GOP scheme if the target representation of the previous segment in the sequence is different from a previously requested target representation and to receive a video segment in an Open GOP scheme if the target representation of the previous segment in the sequence is identical to a previously requested representation.

Thus, user terminal 500 according to the invention is able to request segments in different representations according to the available bandwidth while receiving segments at a good quality rate ratio thanks to the use, in most cases, of segments in an Open GOP scheme without issues of references between frames of different segments. Thus, user terminal 500 of an embodiment benefits from the full flexibility of OTT video delivery and is able to display the video at the best possible quality according to the available bandwidth, thereby improving the user experience.

According to various embodiments, user terminal 500 is able to increase even more the quality of the video displayed to the user by adapting the rules of selection of the target representation to the Open GOP scheme. As explained below, user terminal 500 may be configured to select a target representation for each segment according to parameters such as the available bandwidth, the remaining battery level, available CPU, and the like. The most frequently used rules are relative to the selection of the representation that provides the best video quality that can be displayed in real time according to the available bandwidth, which is to say, the representation that provides the best video quality while having a bitrate below a given threshold. This generally consists in selecting the resolution that induces the best video quality for a video below a bitrate threshold.

In prior art user terminals, video segments start with a Closed GOP. Thus, the quality of video is lower than what can be expected with an open GOP encoding scheme, for a given bitrate, and it may be sometime preferable to select a representation having a low resolution that will be slightly blurred, than a representation having a high resolution and poor quality of encoding, which will result in disturbing compression artifacts.

On the other hand, a user terminal according to the an embodiment of the invention can use rules of selection of a target representation amongst candidate target representations that comprise: (a) determining a maximum bitrate threshold according to one of an the available bandwidth and the state of the connection of the user terminal to the content delivery network, (b) attributing to candidate target representations in the list indexes of quality based on their resolution and their bitrate for a segment of video encoded in an Open GOP scheme, and (c) selecting the candidate target representation which has the best index of quality while having a bitrate below the maximum bitrate threshold.

Thus, a user terminal according to an embodiment of the invention will generally select a representation with a higher resolution than a prior art user terminal. However, the quality of the video remains high since the vast majority of segments are encoded in an Open GOP scheme. Thus, a user terminal of an embodiment allows the user to enjoy video content with low latency, high video quality, and a resolution of video generally higher than in prior art user terminals.

It is possible to use a user terminal of an embodiment in combination with video server according to an embodiment of the invention, and a person of ordinary skill in the art can easily adapt the embodiments described with reference to FIGS. 4a to 4c to a user terminal.

Figure 6A:
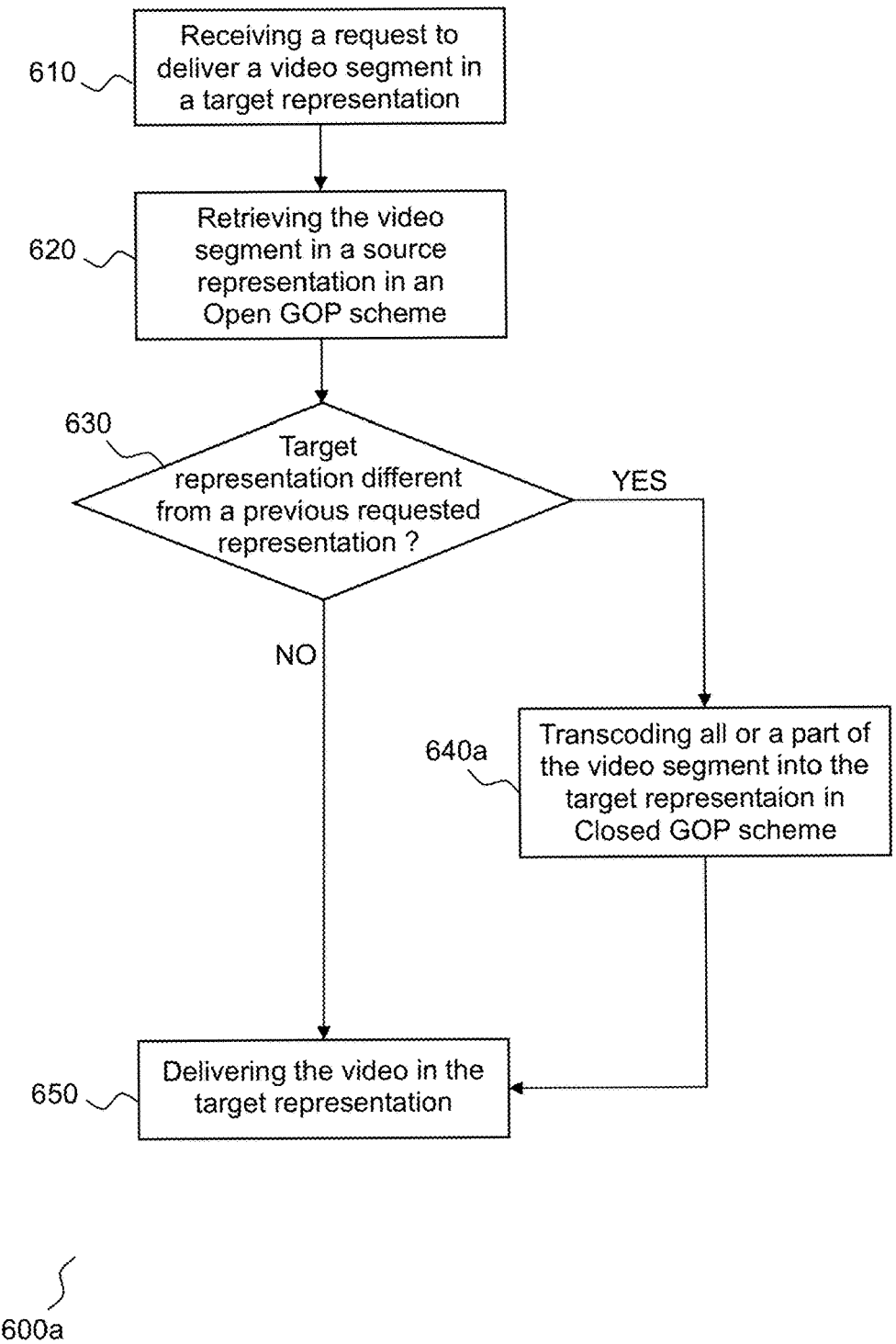
FIGS. 6a, 6b and 6c illustrate approaches for delivering video to a user terminal according to various embodiments of the invention.
Figure 6B:
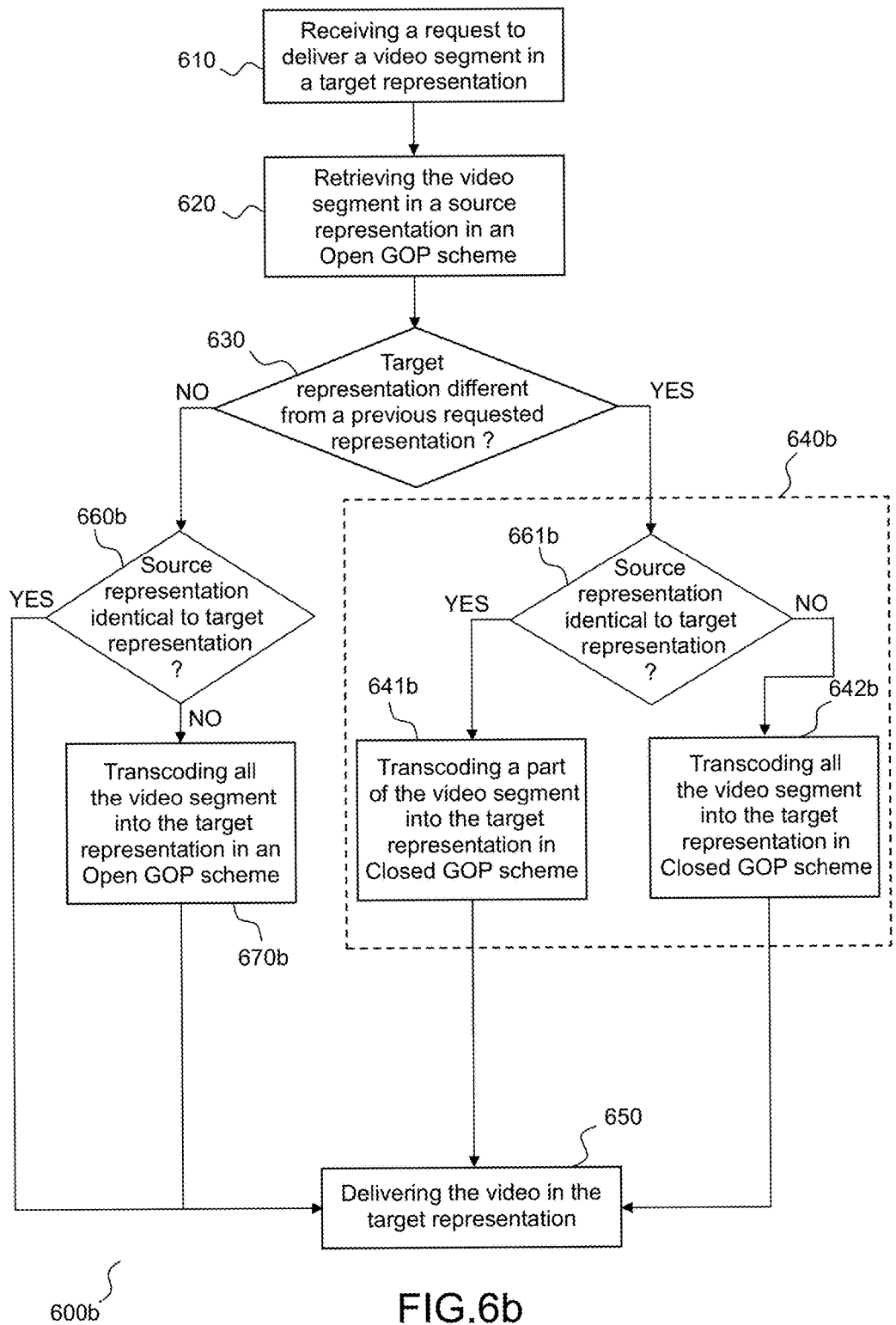
Figure 6C:
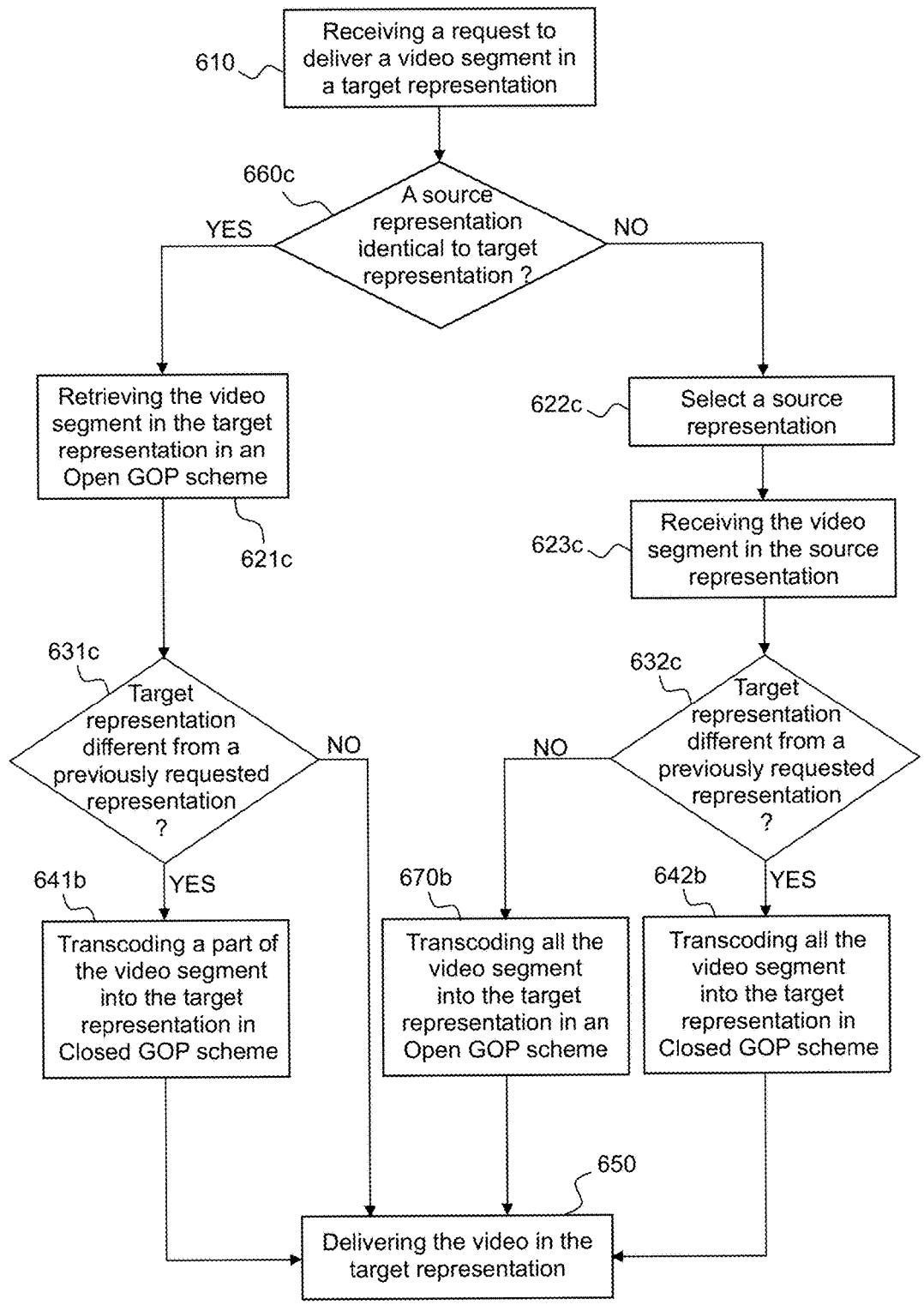

FIGS. 6a, 6b, and 6c are flowcharts illustrating examples of delivering video to a user terminal according to embodiment of the invention. FIG. 6a illustrates a first process 600a of delivering video to a user terminal according to an embodiment. Process 600a can for example be performed by a video server 400a, 400b, 400c according to an embodiment or in any device which is configured to deliver video by segments to a user terminal.

In step 610, a request to deliver a video segment in a target representation is received from the user terminal.

Process 600a further comprises step 620 of retrieving, from storage capabilities, the video segment in at least one source representation in an Open GOP coding scheme. In a number of embodiments of the invention, the segments of video are pre-recorded and stored on storage capabilities in one or more source representations. In other embodiments of the invention adapted for live contents, the segments of video are produced live and stored progressively in one or more source representations. In either embodiments of the invention, at step 620, the video segment is retrieved in at least one source representation. If more than one source representation is available on the storage capability, the video segment is retrieved at step 620 in a source representation which is the best suited according to the target representation of the request. Examples of selection of a source representation according to the target representation are provided with reference to FIG. 4a.

Process 600a further comprises step 630 of verifying if the target representation is different from a representation previously served to the user terminal. In a number of embodiments of the invention, the successive segments form a sequence, and step 630 consists in verifying if the target representation is different from the target representation of the previous segment in the sequence.

If the target representation is different from a representation previously requested by the user terminal, process 600a comprises step 640a of transcoding all or a part of the video segment in the at least one source representation in an Open GOP scheme into the video segment in the target representation in a Closed GOP scheme. Process 600a further comprises step 650 of delivering the video segments in the target representation to the user terminal.

Thus, if there is a change of representation of the segments, process 600a delivers to the user terminal segments of video in a Closed GOP scheme which do not reference a frame in another representation; thus, the delivered segments may be properly decoded by any video decoder. Meanwhile, most of the video segments are sent in an Open GOP scheme, which have higher compression efficiency.

Those of ordinary skill in the art can easily adapt the various embodiments of video servers 400a, 400b and 400c employ process 600a.

FIG. 6b illustrates a process 600b of delivering video to a user terminal in accordance with an embodiment of the invention. Process 600b comprises the steps 610, 620, 630, and 650 of process 600a. If the target representation is different from a representation previously requested by the user terminal, Process 600b comprises step 640b of transcoding all or a part of the video segment in the at least one source representation in an Open GOP scheme into the video segment in the target representation in a Closed GOP scheme.

In an embodiment, step 640b comprises a substep 661b of verifying whether the source representation which has been selected in step 620 is identical to the target representation. If it is the case, the step 640b comprises a substep 641b of transcoding a part of the video segment into the target representation in a closed GOP scheme. For example this step may consist in re-encoding the frames of the segment which reference frames in a previous segment, while letting the other frames go unmodified.

If it is not the case, then step 640b comprises a substep 642b to transcode the whole video segment from the source representation which has been selected at step 620 into the target representation in the closed GOP scheme.

If the target representation is not different from a previously requested representation, process 600b comprises step 660b to verify whether the source representation which has been selected at step 620 is identical to the target representation. If it is the case, it means that the user terminal requested a video segment in one of the source representations, which is identical to the previously requested target representation. Thus, the video segment in the source representation is directly sent, at step 650, to the user in the Open GOP scheme. Some frames in the GOP reference frames in the previous GOP, which will be decodable at the terminal since they have the same target representation.

If it is not the case, process 600b comprises a step 670b of transcoding all the video segment into the target representation in an Open GOP scheme. Thus, the segment can be delivered at step 650 in the right representation. Meanwhile, the segment is encoded using an Open GOP scheme, which allows a better quality-rate ratio than a Closed GOP scheme, and will be decodable, since the previous segment wherein reference frames are found is in the target representation.

Thus, process 600b permits to (a) deliver in any case video segments to the user in the target representation, (b) limit the computing load by transcoding the minimum number of frames, i.e., only the frames which reference a previous segment in step 641b and all the frames of the segment in steps 670b and 642b, improve the bandwidth usage by sending, whenever possible, segments in an Open GOP scheme.

FIG. 6c illustrates process 600c for delivering video to a user terminal in accordance with an embodiment of the invention. Process 600c comprises first the step 610 of receiving a request to deliver a video segment in a target representation, then a step 660c to determine if at least one source representation is identical to the target representation. Various approaches are possible to determine if at least one source representation is identical to a target representation. If the source representations are stored on a head-end server and the method is executed on an edge server, the head-end server can provide to the edge server a list of the source representations. If the source representations are stored on the video server where the method is executed, the video server can create and update a table of the source representations. A person of ordinary skill in the art can easily ascertain approaches for identifying the source representations adapted to a video server.

If at least a source representation is identical to the target representation, then step 621c of retrieving the video segment in the target representation in an Open GOP scheme is performed. Process 600c then verifies, at step 631c, whether the target representation is different from a previously requested representation. If the target representation is identical to a previously requested target representation, at step 650, the segment in the target representation is delivered directly in an Open GOP scheme. On the other hand, if the target representation is different from a previously requested target representation, step 641b of transcoding a part of the segment into the target representation in a Closed GOP scheme is performed. Thereafter, at step 650, the segment transcoded in the target representation in a Closed GOP scheme is delivered.

If no source representation is identical to the target representation, process 600c comprises a step 622c of selecting the source representation which is the most adapted to the target representation. If there is more than one source representation, several rules are possible for selecting the source representation. For example, step 622c may, in selecting a source representation which has a resolution identical to the target representation, a source representation which has a bitrate as close as possible to the bitrate of the target representation.

Process 600c then comprises a step 623c of verifying whether the target representation is different from a previously requested representation. If the target resolution is different, the step 642b is performed. In step 642b, all the video segments from the source representation in an open GOP scheme to the target representation are transcoded in a Closed GOP scheme. If the target resolution is identical to a previously requested representation, then step 670b of transcoding all the video segment from the source representation in an Open GOP scheme into the target representation in a Closed GOP scheme is performed. The transcoded segment is delivered to the user terminal in the target representation afterwards at step 650.

In process 600c, the tests to determine whether the target representation is one of the source representations and to determine whether the target representation is or is not identical to previously requested target representations are performed in an order opposite to the order of process 600b. However, the result is relatively similar in that: (a) in process 600c, all or a part of the video segment is transcoded into the target representation in a Closed GOP scheme if the target representation is different from a previously requested target representation, at one of steps 641b and 642b, and (b) the decoder will not have trouble to decode the video segments since the video segments are sent in an Open GOP mode only if the target representation is identical to a previously requested target representation.

This example demonstrates that different orders of the steps of process 600a, 600b, and 600c are possible, as soon as all or a part of the video segment is transcoded into the target representation in a Closed GOP mode when the target representation is different from a previously requested target representation.

Figure 7A:
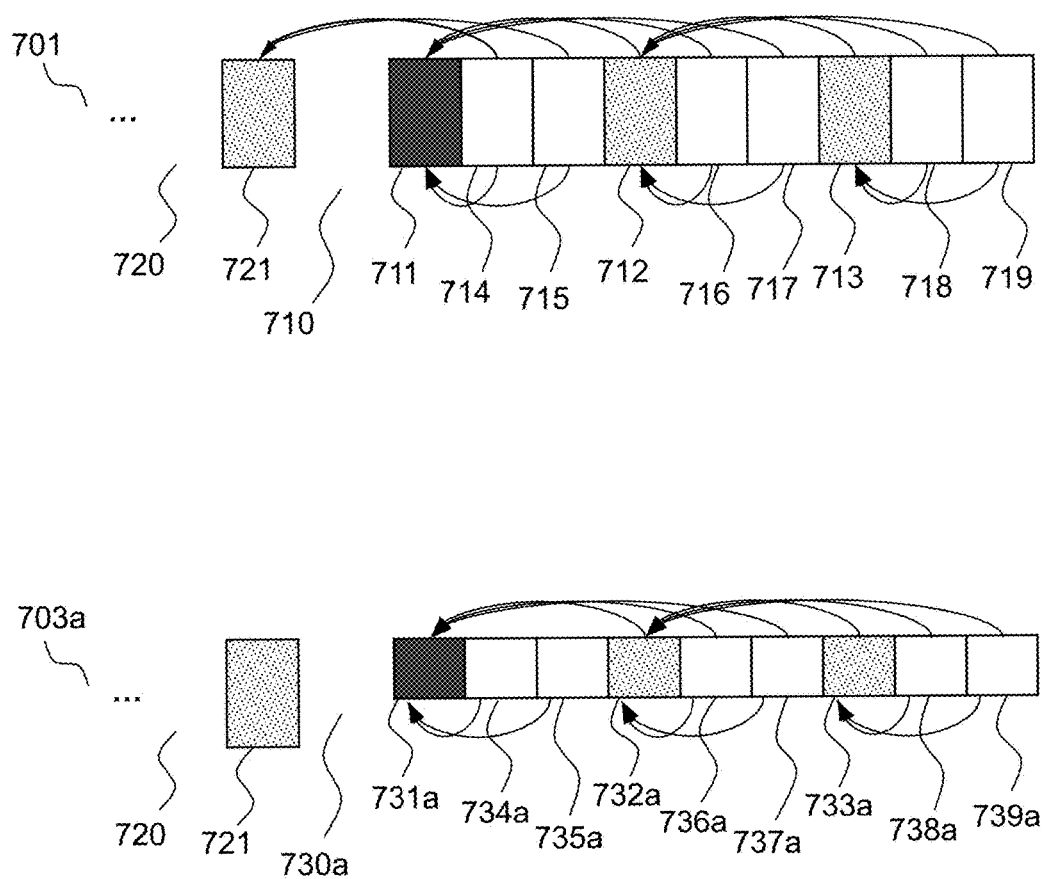
FIGS. 7a and 7b illustrate the transcoding of video segments from source to target representations according to various embodiments of the invention.
Figure 7B:
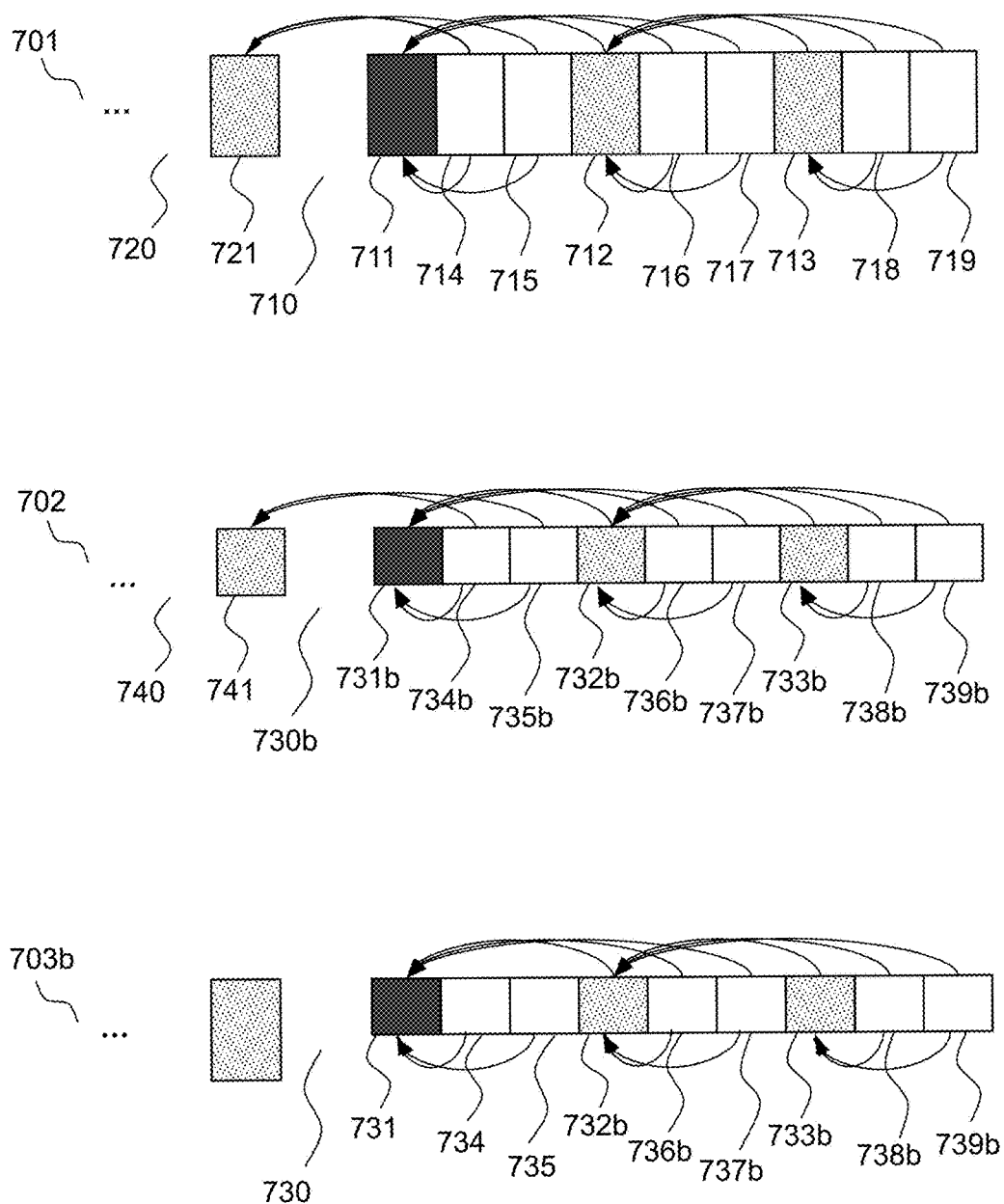

FIGS. 7a and 7b illustrate the transcoding of video segments from source to target representations, in two embodiments of the inventions, wherein there are respectively one and two source representations. FIG. 7a illustrates the transcoding of a video segment from a source to a target representation according to an embodiment of the invention.

The segment of video is available in a single source representation 701. The video segment 710 in representation 701 comprises one I frame 711 and two P frames 712 and 713. Video segment 710 also comprises six B frames 714, 715, 716, 717, 718 and 719. The arrows above and below the frames represent the reference between frames. Thus, the B frames 714 and 715 have a reference on frame 721, which is part of a previous segment 720 in the same representation 701.

In this example, the user terminal requested successively a segment in the source representation 701, then a segment in a second representation 702, which is not available in the source representation. The line 703a represents the frames received by the user terminal. Thus, the user terminal receives the segment 720 comprising the frame 721. Since the representation 702 is not available as a source representation, segment 710 in the first representation 701 is transcoded into a segment 730a in the second representation 702. The video segment 730a in the representation 702 comprises an I frame 731a and two P frames 732a and 733a. Video segment 730a also comprises six B frames 734a, 735a, 736a, 737a, 738a and 739a. Since video segment 730a has a representation which is different from the representation of segment 720, the B frames are encoded without reference to frame 721 so that the segment can be properly decoded.

FIG. 7b illustrates the transcoding of a video segment from a source to a target representation according to an embodiment of the invention where there are two different representations. In this example, two source representations are available, namely representation 701 and representation 702. Video segments 720 and 710 are available in representation 701. Meanwhile, corresponding segments 740 and 730b are available in representation 702. Video segment 740 comprises, amongst other frames, a frame 741. Meanwhile, video segment 730b at resolution 702 comprises one I frame 731b and two P frames 732b and 733b. Video segment 730b also comprises six B frames 734b, 735b, 736b, 737b, 738b and 739b. The arrows above and below the frames represent the reference between frames. Thus, the B frames 734b and 735b have a reference on frame 741, which is part of a previous segment 740 in the same representation 702.

In this example, the user terminal successively requests a segment in resolution 701 and a segment in resolution 702. The line 703b represents the frames received by the user terminal. The user terminal first receives segment 720 in representation 701. Then, the user terminal receives a segment 730 in representation 702, which is obtained by transcoding segment 730b. According to a number of embodiments of the invention, a video server or a process according to the invention re-encodes only frames 734b and 735b which reference frame 741 that is not transmitted to the user terminal in order to limit the computing load. Thus, segment 730 is formed by keeping frames 731b, 732b, 736b, 737b, 733b, 738b, and 739b of the video segment 730, and re-encoding frames 734b and 735b into frames 734 and 735, which reference only frame 731 and not frame 741. Thus, the user terminal, which received frame 721 instead of frame 741, is able to properly decode the video segment and the computing load is limited, since there are only two frames in the segment to re-encode.

These examples demonstrate the ability, thanks to embodiments invention, to transcode video segments from a source representation to a target representation and deliver the requested target representations to a user terminal, while adapting to the source resolution available, avoiding decoding issues, providing the best video quality for a given available bandwidth by using an Open GOP scheme whenever possible, and limiting the computing load by limiting the number of frames to re-encode whenever possible.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction or continuation. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A video server, comprising:
   an input port configured to receive, from a user terminal, requests to deliver video segments in a target representation;
   an output port configured to deliver the requested video segments to the user terminal in said target representation;
   a data link configured to retrieve from storage capabilities, for each request from the user terminal, a video segment in at least one source representation in an Open GOP scheme;
   a determination capability to determine whether the target representation is different than any type of representation previously requested from said user terminal;
   an access to one or more first video transcoding capabilities that, upon determining that said target representation is different than said any type of representation, transcodes at least a part of the video segment in said at least one source representation in an Open GOP scheme into the requested target representation in a Closed GOP scheme; and
   an access to one or more second video transcoding capabilities that, upon determining that said target representation is not different than said any type of representation, transcodes said at least one source representation in an Open GOP scheme into the requested target representation in an Open GOP scheme,
   wherein said at least a part of said video segment transcoded in said Closed GOP scheme comprises two or more sequential groups of pictures (GOPs), and wherein in said Closed GOP scheme each frame of a particular GOP does not reference any prior GOP.

2. The video server of claim 1, wherein video segments form a sequence representative of a video track, and said video server is configured to cause said one or more video transcoding capabilities to transcode all or part of the video segment when the target representation is different from the representation provided to the user terminal for the segment preceding said video segment in the sequence.

3. The video server of claim 1, wherein transcoding all or a part of the video segment comprises re-encoding a bi-directional frame which has a reference frame in a previous segment so that the bi-directional frame references only an intra-predicted frame within the segment.

4. The video server of claim 1, being further configured, if the target representation is different each one of the at least one source representation, to cause said one or more video transcoding capabilities to transcode the video segment from one of the at least one source representation to the target representation.

5. The video server of claim 4, being further configured to:
use the data link to retrieve, from the storage capabilities, symbols representative of a correspondence of video coding decisions in one of the at least one source representation and video coding decisions in the target representation; and
provide said symbols to said one or more video transcoding capabilities as an input parameter to transcode the video segment from one of the at least one source representation to the target representation.

6. The video server of claim 1, wherein the target representation is selected by the user terminal in a list of possible target representations.

7. The video server of claim 1, wherein a representation is defined by at least one of a resolution, a bitrate, a video codec, and a packaging format.

8. The video server of claim 1, wherein the target representation is selected by the user terminal in a list of possible target representations, and wherein a representation is defined by at least a resolution, the list of possible target representations define at least two possible resolutions, and storage capabilities store each video segment in at least one source representation in Open GOP for each of said at least two possible resolutions.

9. The video server of one of claim 1, wherein the data link is a data bus, and wherein said storage capabilities reside on the same physical machine as the video server.

10. The video server of one of claim 1, wherein the data link is a connection to at least another server, and wherein said storage capabilities reside on the same physical machine as said at least another server.

11. A non-transitory computer-readable storage medium storing one or more sequences of instructions, which when executed by one or more processors, cause:
receiving, from the user terminal, a request to deliver a video segment in a target representation;
retrieving, with the use of a data link, from storage capabilities, the video segment in at least one source representation in an Open GOP scheme;
upon determining that the target representation is not different from a representation previously provided to the user terminal, transcoding at least a part of the video segment in said at least one source representation in an Open GOP scheme into the target representation in an Open GOP scheme,
upon determining that the target representation is different from a representation previously provided to the user terminal, transcoding at least a part of the video segment in said at least one source representation in an Open GOP scheme into the target representation in a Closed GOP scheme,
wherein said at least a part of said video segment transcoded in said Closed GOP scheme comprises two or more sequential groups of pictures (GOPs), and wherein in said Closed GOP scheme each frame of a particular GOP does not reference any prior GOP; and
delivering the video segments in the target representation to the user terminal.

12. The non-transitory computer-readable storage medium of claim 11, wherein video segments form a sequence representative of a video track, and said video server is configured to cause said one or more video transcoding capabilities to transcode all or part of the video segment when the target representation is different from the representation provided to the user terminal for the segment preceding said video segment in the sequence.

13. The non-transitory computer-readable storage medium of claim 11, wherein transcoding all or a part of the video segment comprises re-encoding a bi-directional frame which has a reference frame in a previous segment so that the bi-directional frame references only an intra-predicted frame within the segment.

14. The non-transitory computer-readable storage medium of claim 11, wherein execution of the one or more sequences of instructions further cause, if the target representation is different each one of the at least one source representation, said one or more video transcoding capabilities to transcode the video segment from one of the at least one source representation to the target representation.

15. The non-transitory computer-readable storage medium of claim 14, wherein execution of the one or more sequences of instructions further cause:
use the data link to retrieve, from the storage capabilities, symbols representative of a correspondence of video coding decisions in one of the at least one source representation and video coding decisions in the target representation; and
provide said symbols to said one or more video transcoding capabilities as an input parameter to transcode the video segment from one of the at least one source representation to the target representation.

16. The non-transitory computer-readable storage medium of claim 11, wherein the target representation is selected by the user terminal in a list of possible target representations.

17. The non-transitory computer-readable storage medium of claim 11, wherein a representation is defined by at least one of a resolution, a bitrate, a video codec, and a packaging format.

18. The non-transitory computer-readable storage medium of claim 11, wherein the target representation is selected by the user terminal in a list of possible target representations, and wherein a representation is defined by at least a resolution, the list of possible target representations define at least two possible resolutions, and storage capabilities store each video segment in at least one source representation in Open GOP for each of said at least two possible resolutions.

19. The non-transitory computer-readable storage medium of claim 11, wherein the data link is a data bus, and wherein said storage capabilities reside on the same physical machine as the video server.

20. The non-transitory computer-readable storage medium of claim 11, wherein the data link is a connection to at least another server, and wherein said storage capabilities reside on the same physical machine as said at least another server.

21. A method of delivering video content to a user terminal, comprising:
receiving, from the user terminal, a request to deliver a video segment in a target representation;
retrieving, from storage capabilities, the video segment in at least one source representation in an Open GOP scheme;
upon determining that the target representation is different from a representation previously provided to the user terminal, transcoding at least a part of the video segment in said at least one source representation in an Open GOP scheme into the target representation in a Closed GOP scheme;

upon determining that the target representation is not different from a representation previously provided to the user terminal, transcoding at least a part of the video segment in said at least one source representation in an Open GOP scheme into the target representation in an Open GOP scheme, wherein said at least a part of said video segment transcoded in said Closed GOP scheme comprises two or more sequential groups of pictures (GOPs), and wherein in said Closed GOP scheme each frame of a particular GOP does not reference any prior GOP; and delivering the video segments in the target representation to the user terminal.

* * * * *